US009518868B2

(12) United States Patent
Panjwani

(10) Patent No.: US 9,518,868 B2
(45) Date of Patent: Dec. 13, 2016

(54) INFRARED DETECTOR WITH METAL-BLACK COATING HAVING DIELECTRIC OVERLAYER AND RELATED METHODS

(71) Applicant: UNIVERSITY OF CENTRAL FLORIDA RESEARCH FOUNDATION, INC., Orlando, FL (US)

(72) Inventor: Deep Panjwani, Gujarat (IN)

(73) Assignee: UNIVERITY OF CENTRAL FLORIDA RESEACH FOUNDATION, INC., Orlando, FL (US)

(*) Notice: Subject to any disclaimer, the term of this patent is extended or adjusted under 35 U.S.C. 154(b) by 22 days.

(21) Appl. No.: 14/308,879

(22) Filed: Jun. 19, 2014

(65) Prior Publication Data

US 2014/0374597 A1 Dec. 25, 2014

Related U.S. Application Data

(60) Provisional application No. 61/837,868, filed on Jun. 21, 2013.

(51) Int. Cl.
*G01J 5/08* (2006.01)
*G01J 5/04* (2006.01)

(52) U.S. Cl.
CPC ............. *G01J 5/0853* (2013.01); *G01J 5/046* (2013.01)

(58) Field of Classification Search
CPC ............. G01J 5/20; G01J 5/022; H01L 31/125
See application file for complete search history.

(56) References Cited

U.S. PATENT DOCUMENTS

| 4,595,832 | A | 6/1986 | LaDelfe et al. |
| 6,305,840 | B1 | 10/2001 | Kim et al. |
| 6,579,740 | B2 | 6/2003 | Toyoda |
| 6,919,730 | B2 | 7/2005 | Cole et al. |
| 7,026,602 | B2 | 4/2006 | Dausch |
| 7,057,402 | B2 | 6/2006 | Cole et al. |
| 7,655,909 | B2 | 2/2010 | Schimert et al. |
| 7,683,323 | B2 | 3/2010 | Kymissis |
| 7,718,965 | B1 | 5/2010 | Syllaios et al. |
| 7,800,066 | B2 * | 9/2010 | Talghader .......... A61B 17/3478 250/338.1 |
| 8,294,008 | B2 | 10/2012 | Cole et al. |

(Continued)

OTHER PUBLICATIONS

Harris, "The Transmittance and Reflectance of Gold Black Deposits in the 15- to 100-Micron Region," Journal of the Optical Society of America, vol. 51, No. 1, Jan. 1961, pp. 80-82.

(Continued)

*Primary Examiner* — David Porta
*Assistant Examiner* — Faye Boosalis
(74) *Attorney, Agent, or Firm* — Allen, Dyer, Doppelt, Milbrath & Gilchrist, P.A.

(57) ABSTRACT

An infrared (IR) detector may include a substrate, circuitry carried by the substrate, and a metal-black layer over the thermometric element. The circuitry may include a thermometric element with a measurable thermometric property. The IR detector may include a dielectric layer covering the metal-black layer, and the circuitry provides a value for IR radiation absorbed by the metal-black layer.

16 Claims, 18 Drawing Sheets

(56) References Cited

U.S. PATENT DOCUMENTS

| | | |
|---|---|---|
| 2010/0133536 A1 | 6/2010 | Syllaios et al. |
| 2011/0279680 A1 | 11/2011 | Cole et al. |
| 2013/0248712 A1 | 9/2013 | Abdolvand et al. |

OTHER PUBLICATIONS

Harris et al., "Absorptance of Gold in the Far Infrared," Journal of the Optical Society of America, vol. 51, No. 2, Feb. 1961, pp. 164-167.

Becker et al., "Black Gold Deposits as Absorbers for Far Infrared Radiation," Phys. Stat. Sol. (b) 194, 1996, pp. 241-255.

Nelms et al., "Laser Micromachining of Goldblack Coatings," Applied Optics, vol. 45, No. 27, Sep. 20, 2006, pp. 6977-6981.

Jutzi et al., "Far-Infrared Sensor with LPCVD-Deposited Low-Stress Si-Rich Nitride Absorber Membrane—Part 1. Optical Absorptivity," Sensors and Actuators A 152, 2009, pp. 119-125.

Bell, "A Geostationary Earth Radiation Budget Instrument," SPIE vol. 2209, Nov. 1, 2013, pp. 236-242.

Panjwani et al., "Patterning of Oxide-Hardened Gold Black by Photolithography and Method Lift-Off," Infrared Physics & Technology 62, 2014, pp. 94-99.

Qian et al., "Hardening and Optimizing of the Black Gold Thin Film as the Absorption Layer for Infrared Detector," Optics and Photonics Journal, vol. 3, Jun. 2013, pp. 281-283.

\* cited by examiner

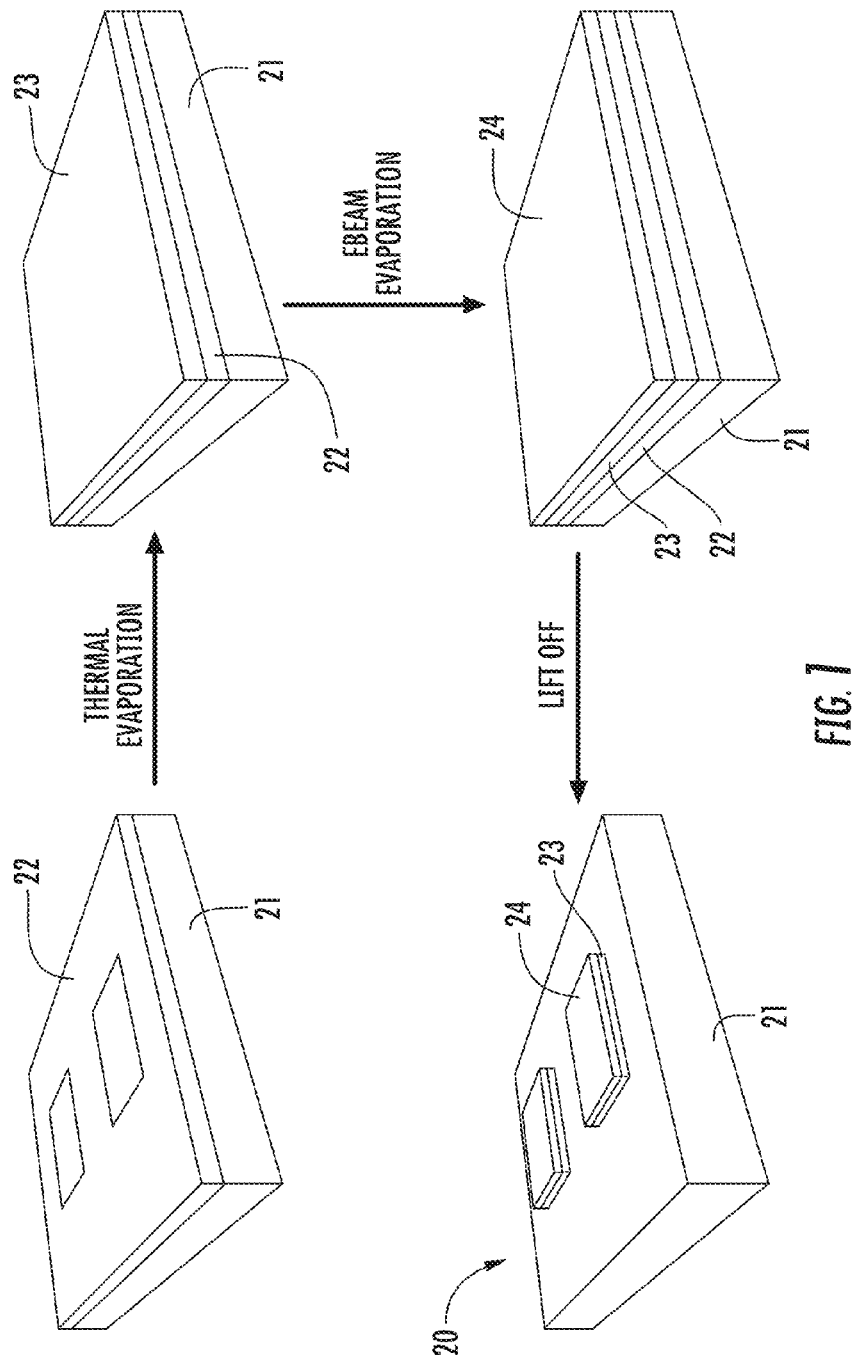

INFRARED DETECTOR WITH METAL-BLACK COATING HAVING DIELECTRIC OVERLAYER AND RELATED METHODS

RELATED APPLICATIONS

This application is based upon prior filed application Ser. No. 61/837,868 filed Jun. 21, 2013, the entire subject matter of which is incorporated herein by reference in its entirety.

TECHNICAL FIELD

This present disclosure relates to sensors and, in particular, to infrared sensors and related methods.

BACKGROUND

In thermal infrared (IR) sensors (e.g. bolometers), absorber coating is generally applied to convert IR incident power into temperature change. Different absorber materials have been investigated (see, e.g., thin metals and SiN films, as disclosed in F. Jutzi, D. H. B. Wicaksono, G. Pandraud, N. de Rooij, P. J. French, "Far-infrared sensor with LPCVD-deposited low-stress Si-rich nitride absorber membrane—Part 1. Optical absorptivity," Sensors and Actuators A 152 (2009) 119-125.). One exemplary material that has been used for dedicated single-use applications, such as space missions, is gold-black, as disclosed in D. A. Bell: A Geostationary Earth Radiation Budget Instrument, Proc. SPIE 2209.236.1994. Gold-black is the most common special case of nano-structured porous coatings known as "metal-blacks".

Gold-black material can achieve absorption close to unity over a broad spectral range from visible to far IR, as disclosed in L. Harris, "The Transmittance and Reflectance of Gold-black Deposits in the 15- to 100-Micron Region," J. Opt. Soc. Am. 51, 80-82 (1961); and L. Harris and P. Fowler, "Absorptance of Gold in the Far Infrared," J. Opt. Soc. Am, 51, 164-167 (1961). Gold-black is an nano-crystalline deposit of gold with extremely low density and thermal mass and a refractive index close unity, as disclosed in W. Becker, R. Fettig, A. Gaymann and W. Ruppel, "Black Gold Deposits as Absorbers for Far Infrared Radiation," phys. stat. sol. (b) 194, 241 (1996).

Broader commercial application to array detectors has been hampered by gold-black's extreme mechanical fragility, which also makes it difficult to pattern. For array detectors, it is desirable to coat only the sensing element to avoid thermal and electrical bridging between pixels. Laser ablation has been used in the past to remove coatings deposited between the pixels, but this slow process is unsuited to mass production, as disclosed in N. Nelms, J. Dowson, N. Rizvi, and T. Rohr, "Laser micromachining of goldblack coatings," Applied Optics Vol. 45, No. 27 (2006).

SUMMARY

In view of the foregoing background, it is therefore an object of the present disclosure to provide an IR absorber for IR sensors that is more readily manufactured and patterned.

This and other objects, features, and advantages in accordance with the present disclosure are provided by an IR detector. The IR detector may include a substrate, circuitry carried by the substrate, a metal-black layer over the thermometric element, and a dielectric layer covering the metal-black layer. The circuitry may include a thermometric element with a measurable thermometric property. The circuitry may provide a value for IR radiation absorbed by the metal-black layer (e.g. a gold-black layer). Advantageously, the metal-black layer may be protected during a standard manufacturing procedure known as "lift-off", which allows it to be patterned so that it selectively coats certain elements without coating regions where it is not desired.

In particular, the dielectric layer may comprise a silicon dioxide layer. The dielectric layer and the metal-black layer may form a continuous interface. The dielectric layer may comprise an evaporated dielectric layer, for example. The substrate may comprise silicon material. The dielectric layer may have a thickness between 50 nm and 550 nm.

Another aspect is directed to a method for making an IR detector. The method may include forming a metal-black layer over a substrate, the metal-black layer to be coupled to circuitry on the substrate, and forming a dielectric layer covering the metal-black layer.

Additionally, the method may further comprise forming a photoresist pattern layer on the substrate. The forming of the metal-black layer may be over the photoresist pattern. In some embodiments, the forming of the dielectric layer may comprise an electron beam evaporation of a dielectric material. The method may further comprise removing the photoresist pattern layer together with the metal-black layer residing on top of it without removing the remainder metal-black layer. The method of the removal may be one commonly referred to in the industry as "lift-off".

BRIEF DESCRIPTION OF THE DRAWINGS

FIG. 1 is a schematic diagram of perspective views of steps in making a patterned gold-black IR-absorber, according to the present disclosure.

FIG. 8b is an integrated infrared image (900-3700 $cm^{-1}$) of a region from FIG. 8a.

FIG. 12b is an enlarged portion of the SEM image of FIG. 12a.

DETAILED DESCRIPTION

Figure 2A:
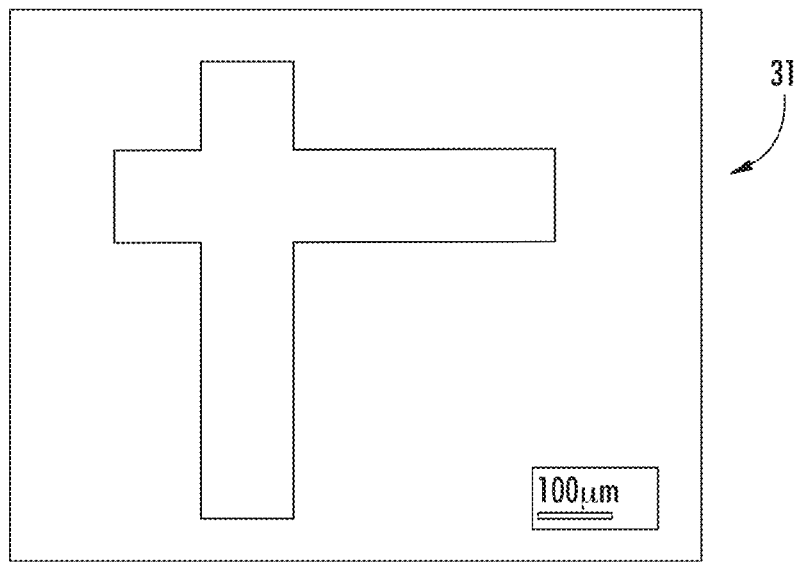
FIG. 2a is a scanning electron microscope (SEM) image of a photo-lithographically produced gold-black pattern, where the gold-black has been overcoated with 150 nm $SiO_2$ on Si substrate, according to the present disclosure.

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Generally speaking, an approach to the problem of protecting the fragile layer with an overcoat of evaporated dielectric is disclosed; and where the absorption spectrum is not significantly affected. Moreover, the protection allows the layer to be patterned by standard photolithography and metal lift-off. An objective of the present disclosure is to provide methods, systems and devices for a mechanical protection layer for protecting the fragile metal/gold-black layer with an overcoat of evaporated dielectric. Another objective of the present disclosure is to provide methods, systems and devices for an overcoat protection that allows the layer to be patterned by standard photolithography and metal lift-off.

The present disclosure discloses preparation of mechanically robust sub-millimeter scale gold-black patterns having near unity absorption out to mid-infrared wavelengths. The approach is by standard photolithography and metal lift-off, which is made possible by mechanically stabilizing the gold-black with an evaporated oxide coating.

In usual metal lift-off, a photoresist pattern is prepared by spinning photo-resist, exposing this layer to UV through a shadow mask, and developing the mask with solvents to open patterned windows down to the substrate. Then metal is deposited over the entire wafer, which is then submerged in solvent. Those parts of the metal that were resting on photoresist are washed off. The metal stuck to the substrate remains. Lift-off can be performed only if the metal adheres strongly to the substrate and if the metal is not attacked by the solvent. None of these conditions is satisfied by usual gold-black, which is immediately washed off from all areas of the substrate.

To promote adhesion and to mechanically stabilize gold-black, $SiO_2$ was deposited on gold-black coatings before emersion into the lift-off solvents. The resulting patterns are mechanically robust, highly absorbing, and thermally conducting. Thus, this process has excellent prospects for patterning of the broad band gold-black IR absorber to selectively coat the sensing element of array detectors even at length scales of ~10 μm.

During experimental fabrication by Applicant, negative photoresist NR1500 PY is spin-coated to a thickness of 1 μm on silicon substrate. A mask pattern is transferred to the resist using an OAI 200 contact aligner, as available from Optical Associates, Inc. of San Jose, Calif. RD6 developer is used to remove the unexposed parts, leaving behind bare silicon substrate, which is further cleaned by an oxygen plasma descum process.

Referring initially to FIGS. 1-8c, an IR sensor/absorber 20, according to the present disclosure, and an associated method are now described. Gold-black 23 is deposited on the sample 21 with patterned photoresist 22. The sample 21 is placed on a cold temperature-controlled heat sink in a thermal evaporation chamber. The heat sink temperature is maintained at −13° C. using a Peltier device. The chamber is equipped with diffusion pump backed by a mechanical rotary pump, with the capability of reaching pressures below $10^{-5}$ mTorr.

Then, $N_2$ gas is continuously leaked into the chamber during entire process, with the pressure in the chamber maintained at 300-3000 mTorr by adjusting proper nitrogen gas flow rate. Gold wire in the amount 85 mg and of 99.9% purity was placed in a molybdenum boat. The current applied to the boat was 65 amps for all depositions. The $N_2$ gas causes gold atoms to collide and bind with each other to form web-like structures before landing on the sample. The resulting deposition 24 has very low density and a refractive index close to unity. Interestingly, the coatings prepared with high $N_2$ pressure (e.g. 3000 mTorr) are found to have more thickness, porosity and hence more fragility also. Performing lift-off with these coating is possible but far more difficult. Hence, in this work, Applicant utilized 400 mTorr pressure.

The gold-black deposition 23 is fragile and unstable to heat. Accordingly, it is incompatible with plasma-enhanced chemical vapor deposition (PECVD) oxide deposition due to the high temperatures involved. Instead, Applicant deposited SiO$_2$ on the gold-black 23 sample by electron beam evaporation. The source was fused silica pellets of 99.99% purity placed in a 7 cc carbon crucible. The chamber was evacuated to 2×10$^{-6}$ mTorr and a wide, high frequency e-beam sweep pattern was utilized to maintain a high deposition rate of 2-3 nm/s. The thickness of the film and rate of deposition were continuously measured by a quartz crystal monitor (Inficon XTC, as available from Inficon Holding AG of Bad Ragaz, Switzerland). The gold-black substrate was placed normal to the target boat at the optimized distance of 30 cm to keep temperature below 60° C., and a thermocouple monitored the temperature of the substrate holder during the process.

Infrared absorption measurements on blanket coatings were performed using a Vertex 80 FTIR equipped with Hyperion 1000 Microscope, as available from the Bruker Corporation of Billerica, Mass. The microscope is equipped with CaF$_2$ objective (2.4×, NA 0.07), beam splitter with tungsten source and Si diode detector for vis-NIR measurements. The far-IR measurements used ZnSe objective (2.4×, NA 0.07), Globar source, KBr beam splitter and nitrogen-cooled mercury-cadmium-tellure (MCT) detector with 4000-650 cm$^{-1}$ spectral-range. The upper aperture in optical microscope defines the illuminated sample area, which is chosen to be 3 mm$^2$. To attain adequate signal to noise ratio, 128 scans were co-added with the beam on the same spot on the sample at 4 cm$^{-1}$ spectral resolution.

To study variations in reflectance with higher spatial resolution, synchrotron based infrared micro spectroscopy was used. The Infrared Environmental Imaging (IRENI) beam line at the Synchrotron Radiation Center at University of Wisconsin in Madison is equipped with IR microscope interfaced to a Brucker Vertex FT-IR spectrometer. Multiple beams of the bright synchrotron light source are collimated to provide high intensity 1000 times higher than a thermal source, providing extremely high signal-to-noise ratio. A Focal Plane Array (FPA) detector allowed spectral imaging with less than 1-µm spatial resolution. The spectral resolution was 4 cm$^{-1}$, and the spectral range was 900-3700 cm$^{-1}$. For reflectance measurements, the microscope is equipped with 20×, 0.65 numerical aperture (NA) objective. Infrared Imaging & Data Analysis (IRidys) program in IGOR PRO was used to extract spectra from different pixels.

Results & Discussion

Gold-Black Micro Patterns

Figure 2B:
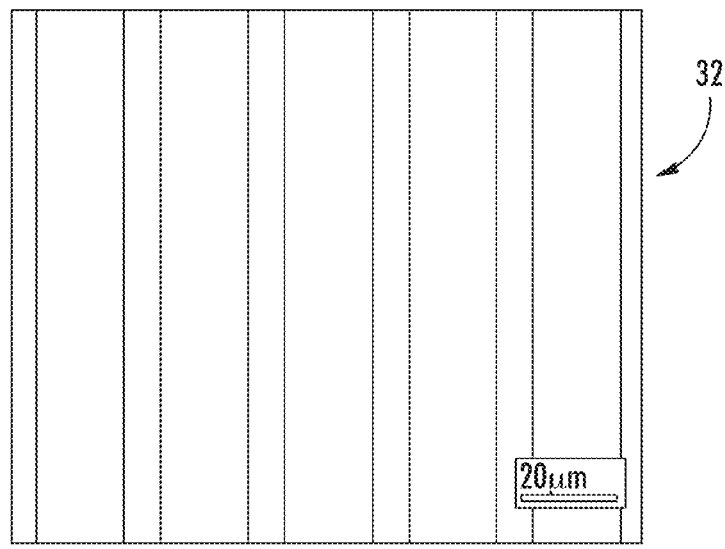
FIG. 2b is an SEM image of a gold-black pattern in the form of stripes of 20 μm width, according to the present disclosure.
Figure 2C:
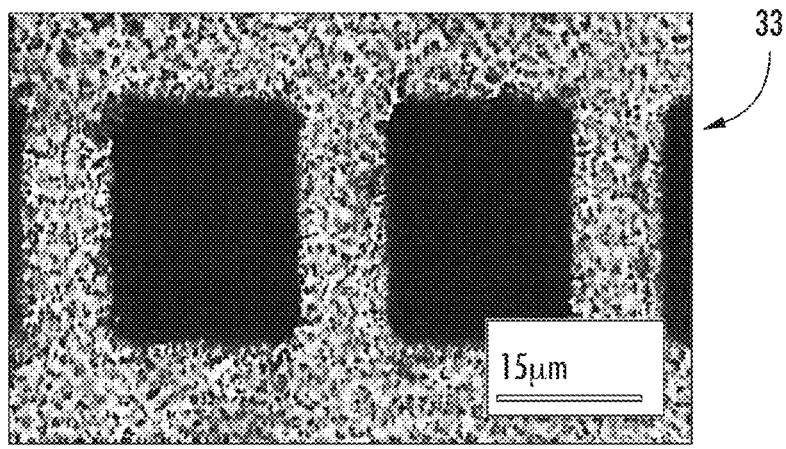
FIG. 2c is an SEM image of a gold-black pattern in the form of lattice with square sub-10 μm openings, according to the present disclosure.

FIGS. 2a-2c present SEM images 31-33 of example gold-black-SiO$_2$ micro patterns on the silicon substrate. In each image, the gold-black appears light while the substrate appears dark. The thickness of the SiO$_2$ protection layer was optimized at 150 nm. Tens of patterns were prepared repeatedly. These exhibited high resistance to mechanical damage while maintaining high infrared absorption. As shown in FIG. 2c, the smallest feature size achieved was approximately 6 µm.

Absorption of Gold-Black after SiO$_2$ Over-Coating and Further Wetting with Acetone.

Figure 3A:
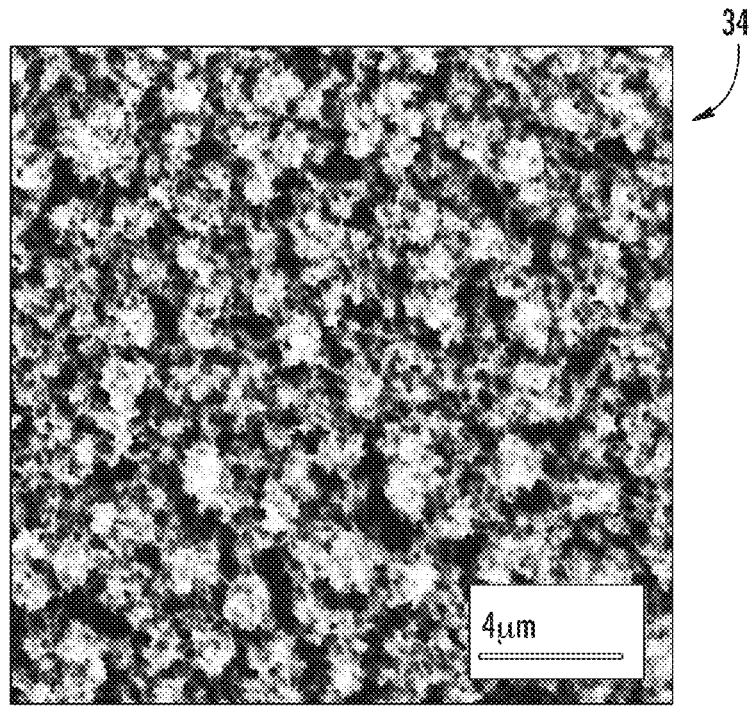
FIG. 3a is an SEM image of a gold-black coating before $SiO_2$ deposition, according to the present disclosure.
Figure 3B:
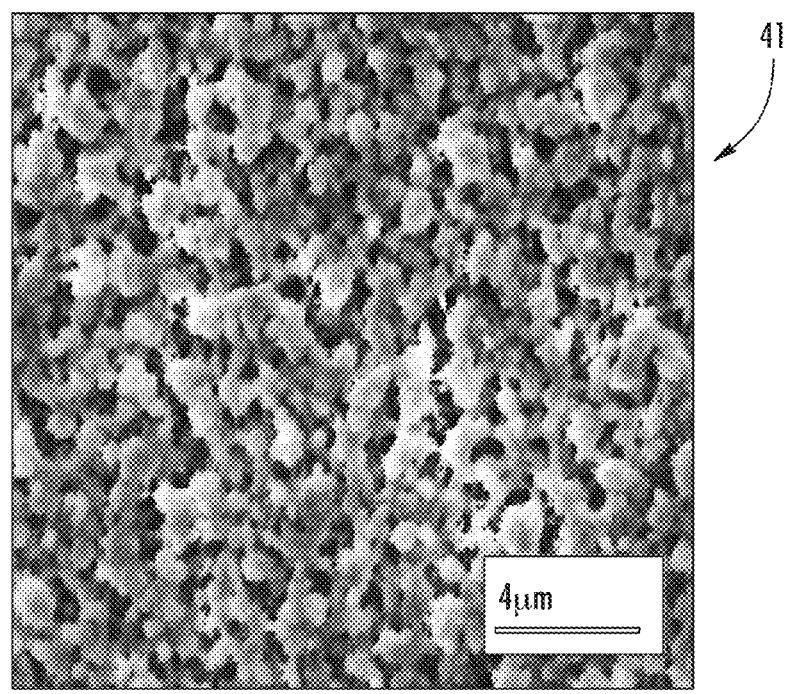
FIG. 3b is an SEM image of gold-black coating after $SiO_2$ deposition, according to the present disclosure.

In order to understand the effects of SiO$_2$ on gold-black absorption, different gold-black coatings on Si substrate were prepared and studied under SEM before and after SiO$_2$ deposition. FIGS. 3a-3b present SEM images 34, 41 of gold-black coatings before and after 150 nm of SiO$_2$ is deposited. The top views in FIGS. 3a-3b indicate that the oxide covers and smoothes the gold-black surface, leaving open only the largest of the pores.

Figure 4A:
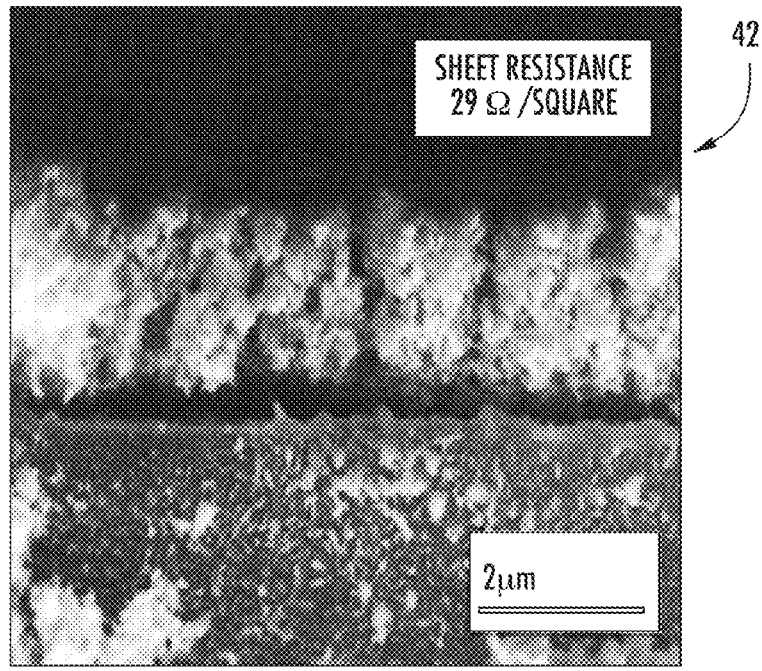
FIG. 4a is an SEM image of a cross-sectional side view of a gold-black coating before $SiO_2$ deposition, according to the present disclosure.
Figure 4B:
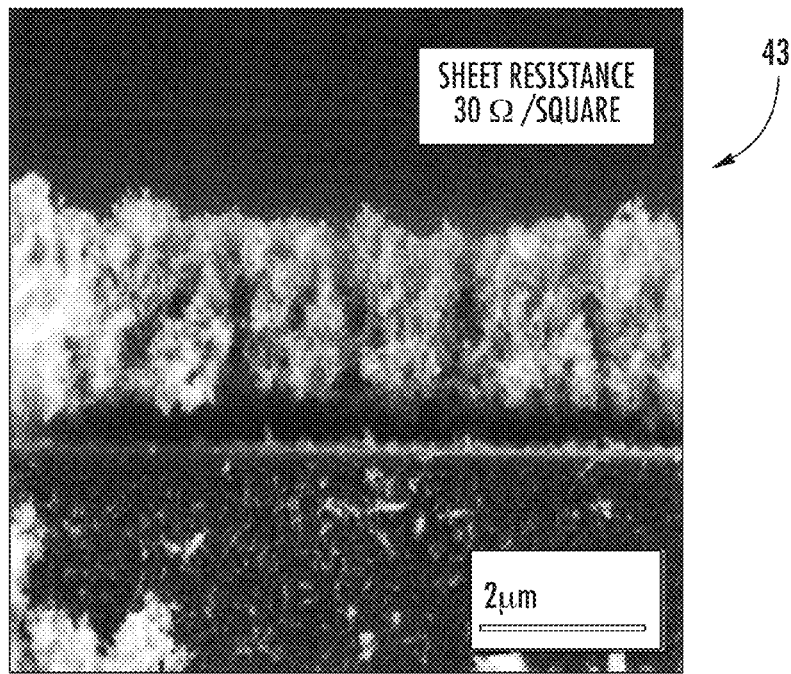
FIG. 4b is an SEM image of a cross-sectional side view of a gold-black coating after $SiO_2$ deposition, according to the present disclosure.

FIGS. 4a-4b show cross-sectional side view images 42-43 of the same sample, which suggests that the gold-black retains its original 3.5 µm thickness after the oxide over-coating. Instead of passing through the open spaces in the gold-black, the oxide forms a continuous film on top, like snow on the boughs of a pine tree. This could be due to fact that particle size of SiO$_2$ is larger than openings in porous gold coatings. The sheet resistance of gold-black coatings was measured using four-probe method to see if oxide causes changes in inter-connectedness of the structure but no significant change in sheet resistance was observed. Therefore, it is concluded that the lower molecular mass of SiO$_2$ allows it to settle on gold-black without compressing it at all.

Figure 5A:
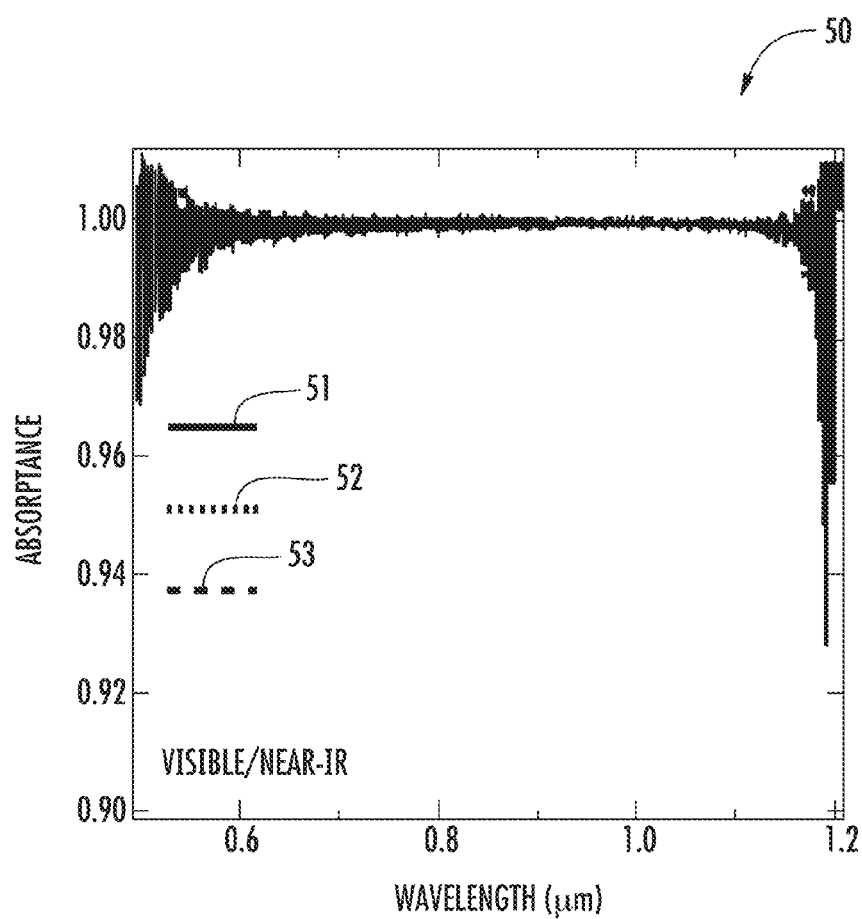
FIG. 5a is a diagram showing absorptance spectra for gold-black coating with 150 nm of $SiO_2$ overcoat in visible-near infrared (NIR), according to the present disclosure.
Figure 5B:
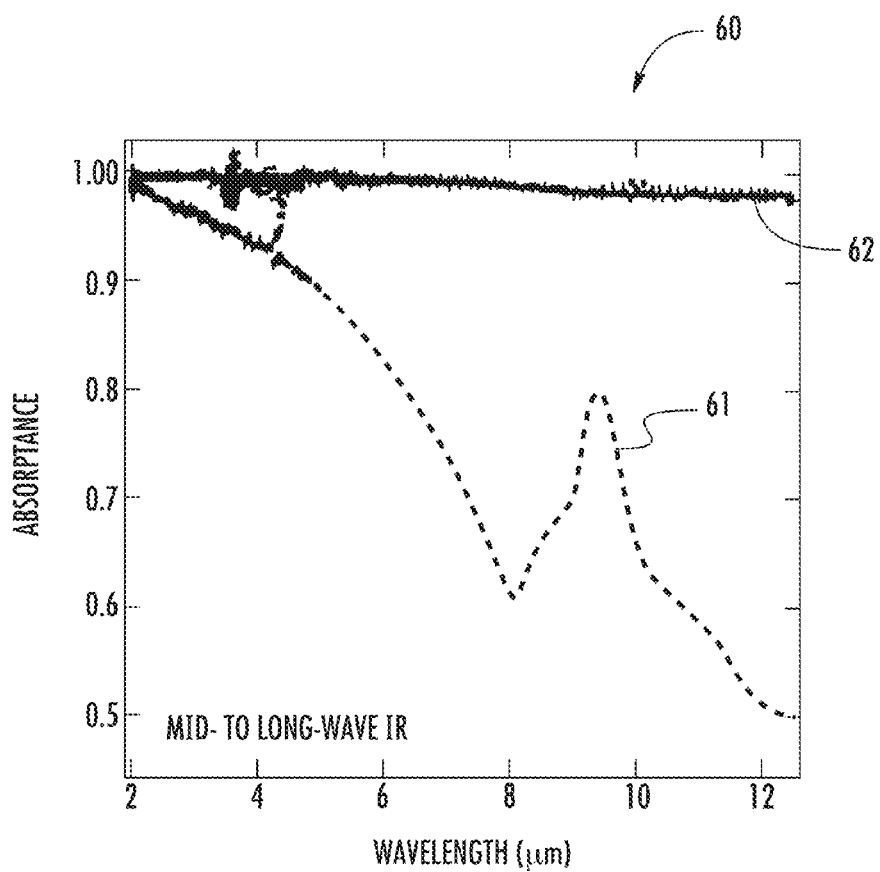
FIG. 5b is a diagram showing absorptance spectra on gold-black coating with 150 nm of $SiO_2$ overcoat in the mid-wave to long-wave infrared.

Due to preserved porosity and conductivity, little change in absorption properties of gold-black after oxide coating is expected. The fraction of light absorbed by the gold-black coating is given by $$A=(1-T-R); \qquad (1)$$

where T is the transmittance and R the reflectance. In case of measurements performed in UV-Visible-NIR, the sample was deposited on optically thick gold surface. Therefore, transmittance through the sample is considered to be 0%. Where, in case of mid-IR measurements, double-sided polished silicon is used as reference for transmission. As shown in FIGS. 5a-5b, after SiO$_2$ deposition, the gold-black absorptance is unchanged in visible as well as mid-IR spectrum.

The lift-off procedure includes usage of acetone as a photoresist solvent, which can pass through the oxide pores and damage gold-black; therefore, it is important to study the absorptance and structural changes after wetting with acetone. From FIGS. 5a-5b, it is evident that after wetting the gold-black coating with acetone, the absorption begins to drop in the infrared spectrum 61, while in the visible spectrum (FIG. 5a) there was no change. It was noticed that the sheet resistance of the same coating dropped from 30 to 8 Ω/square.

Through studies of a number of gold-black samples in SEM, it was observed that after acetone treatment, the thickness of the film dropped by many folds. This is due to collapsing of the film because of acetone solvent. Although, there is oxide over-coating to protect gold-black, just the little solvent passing through "nano gaps" is enough to collapse the fragile gold-black structure.

FIGS. 6a-6d show cross-sectional images 65-68 of one of the unprotected gold-black sample before and after immersion in acetone for 10 seconds respectively. The average thickness of gold-black coating was 4.79 lm before wetting, which drastically collapsed the unprotected film to less than 500 nm. Some portion of the coating completely came off from the substrate.

Figure 6C:
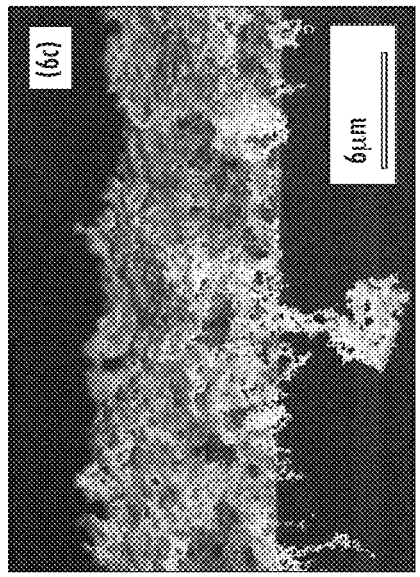
FIG. 6c is a cross-sectional side view SEM image of oxide over-coated gold-black before collapsing, according to the present disclosure.
Figure 6D:
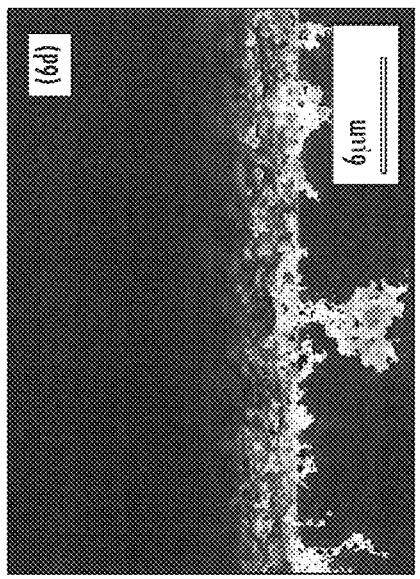
FIG. 6d is a cross-sectional side view of SEM image of oxide over-coated gold-black after collapsing, according to the present disclosure.
Figure 6A:
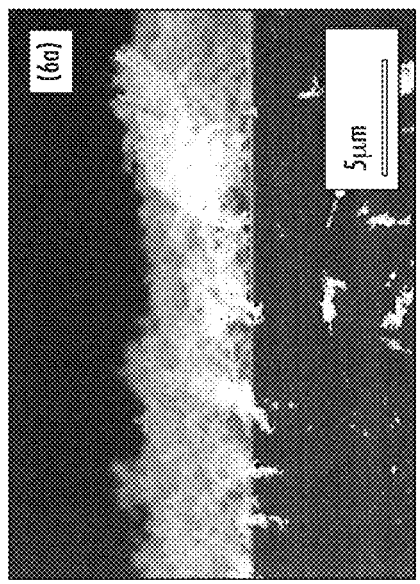
FIG. 6a is a cross-sectional side view SEM image of gold-black coating before collapsing, according to the present disclosure.
Figure 6B:
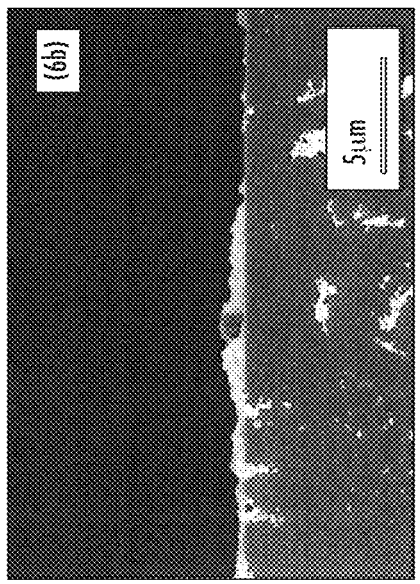
FIG. 6b is a cross-sectional side view SEM image of gold-black coating after collapsing, according to the present disclosure.

FIGS. 6c and 6d present cross sectional SEM images of the same region on the same oxide-protected gold-black sample. In contrast to the unprotected case, 10 s immersion caused only a partial collapse, from 8.79 to 2.44 µm. Since T=0, the reduced long-wave absorptance (FIG. 5) is attributed to increased reflectance due to higher optical density. Reflectivity is still close to zero in the NIR region. It is evident from FIGS. 6a & 6b that without oxide over-coating acetone washes off.

As shown in FIGS. 5a-5b with diagrams 50, 60 (curves 51-53, 61-62), the absorption of gold-black coating is unchanged in visible spectrum after collapsing of the structure, i.e. the coating still retains the black color. However, previous studies on gold-black have shown that it takes a brownish appearance after wetting in acetone or water. The brownish appearance of gold-black feature is due to coalescing of nano-crystallites to form larger the grains. This increases the conductivity and reduces the porosity, which hampers the absorption properties. Similar effect is observed after heating gold-black to over 150° C. However, high absorption in visible and NIR spectrum of the gold-black coatings in our approach is due to additional protection provided by $SiO_2$ over-coating.

Although just 50 nm of oxide is necessary to enable patterning by lift-off, 150 nm is necessary to preserve the absorption in 3-5 µm wavelength window. When the oxide thickness is as high as 500 nm, no pores are visible, which would be ideal for protection of the coating, but the lift-off is not clean. Such films were also found to be cracked after venting the chamber presumably due to compressive stress. Sonication cannot be used to expedite lift-off because it damages the delicate structures. Thus, the optimum thickness appears to be 150 nm.

Absorption of Gold-Black Patterns

In order to study the absorption from micron-size patterns, a Fourier transform infrared (FTIR) spectrometer must have a spatial resolution of less than a micron. Therefore, Applicant investigated gold-black patterns at the University of Wisconsin at Madison Synchrotron Radiation Center, which provides a spatial resolution of 0.54×0.54 µm².

Figure 7A:
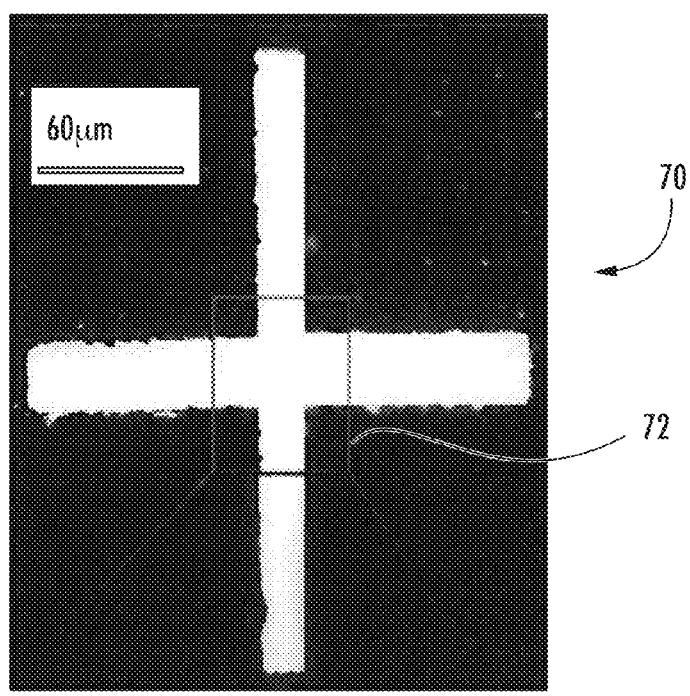
FIG. 7a is an optical microscope image of photo-lithographically patterned gold-black with 150 nm of $SiO_2$ thick protection layer on gold substrate, according to the present disclosure.

FIG. 7a presents the optical image 70, the dark region is gold-black and the bright region is bare gold substrate. A square 72 in image 70 indicates a region that is blown up in an image 71 of FIG. 7b, which is an integrated infrared image in reflectance mode with the scan area of 40×43 µm². The shading scale gives the reflectance values, such that the gold-black region has low reflectance, and gold substrate appears has high reflectance. A region of intermediate reflectance extends greater than approximately 2 to 3 µm distance. The existence of such a gradient in reflectance indicates that the patterning method is limited to spatial dimensions of several microns.

Figure 7B:
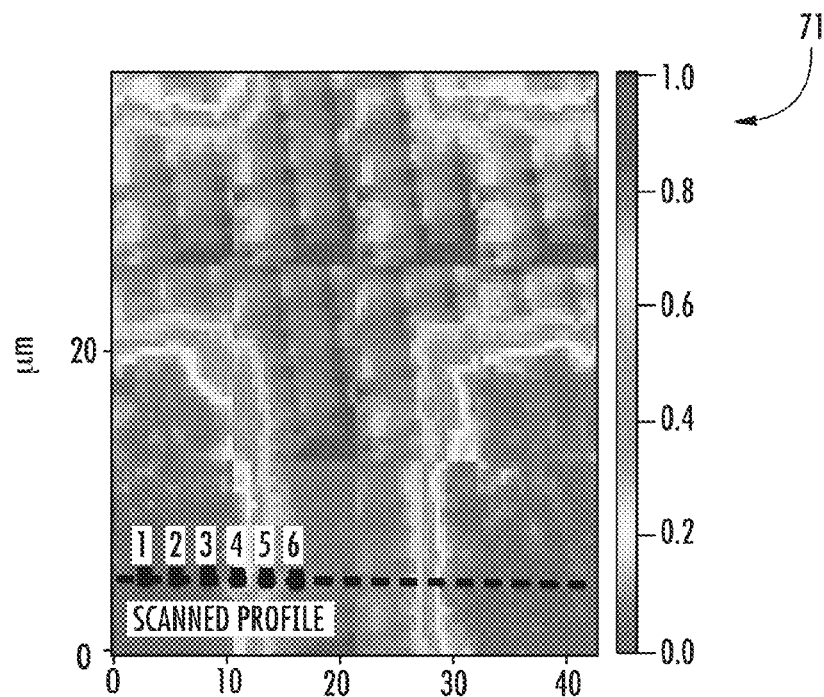
FIG. 7b is an IR image of photo-lithographically-patterned oxide-protected gold-black integrated over the range 900 to 3700 $cm^{-1}$ wavenumber using Infrared Environmental Imaging (IRENI) in reflection mode, according to the present disclosure.
Figure 7C:
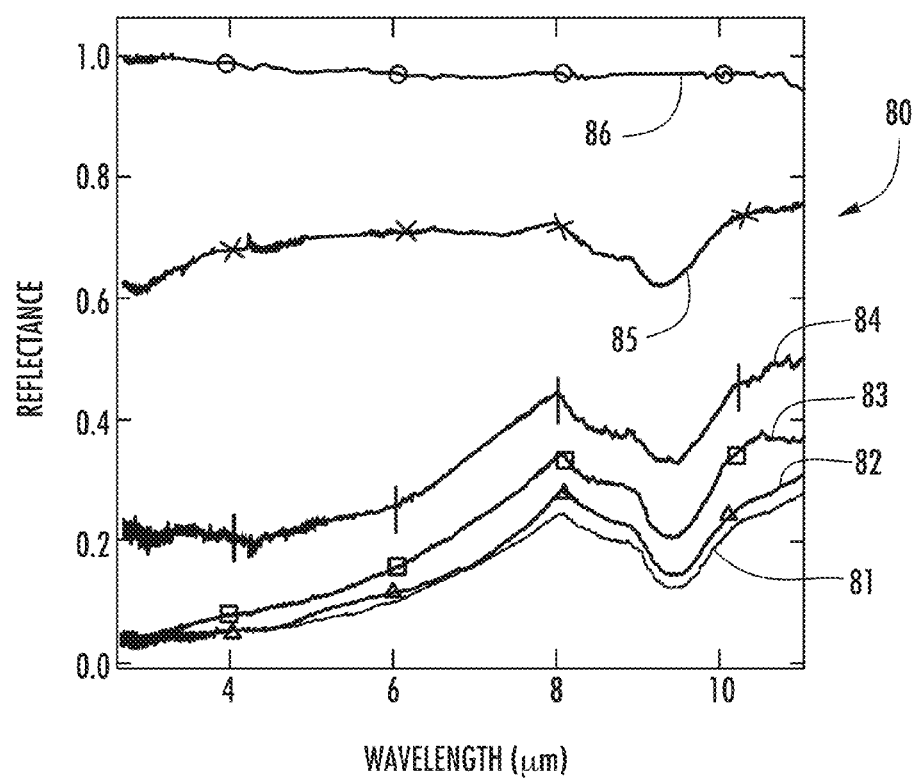
FIG. 7c is a diagram showing the reflectance spectra extracted from six different pixels from an infrared image, according to the present disclosure.

FIG. 7c includes diagrams 80 of reflectance spectra extracted from six different pixels in FIG. 7b. The spectrum extracted from the pixels labeled 1, 2 and 3 (curves 81-83, respectively) are located on the gold-black, show less than approximately 10% average reflection from approximately 3 to 5 µm wavelength. Pixels 4 and 5 (curves 84-85, respectively) lay in the intermediate reflectance region and show a higher overall reflectance and a weaker oxide band at 10 µm, which is due to the amount of oxide tapering off in this region. Pixel 6 (curve 86) is located on the bare gold substrate and shows the expected 100% reflectance from gold surface.

Figure 8A:
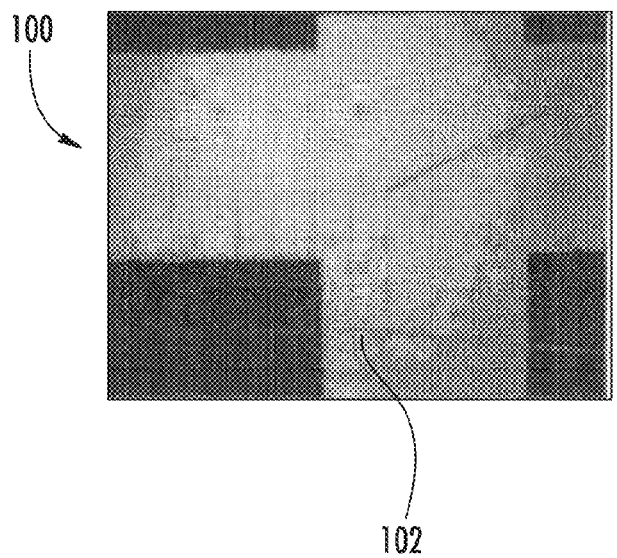
FIG. 8a is an visible microscope image of a gold-black pattern, according to the present disclosure.
Figure 8B:
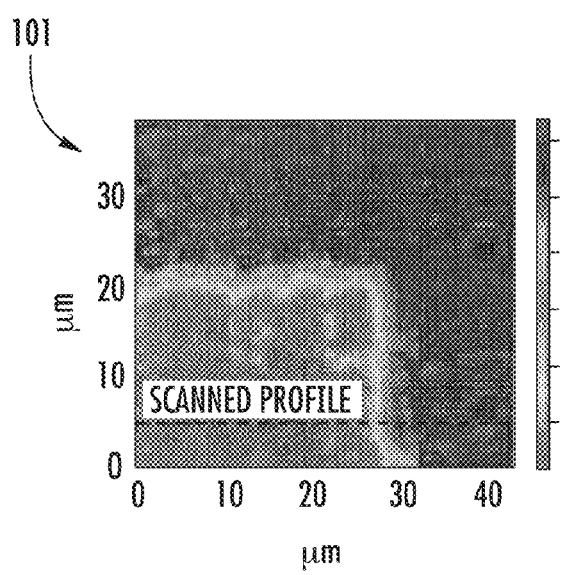

FIGS. 8a-8b are visible and infrared images 100-101 of a gold-black pattern, according to the present disclosure. Image 101 is an integrated infrared image (900-3700 cm$^{-1}$) of a region 102 from visible microscope image FIG. 8a.

Figure 8C:
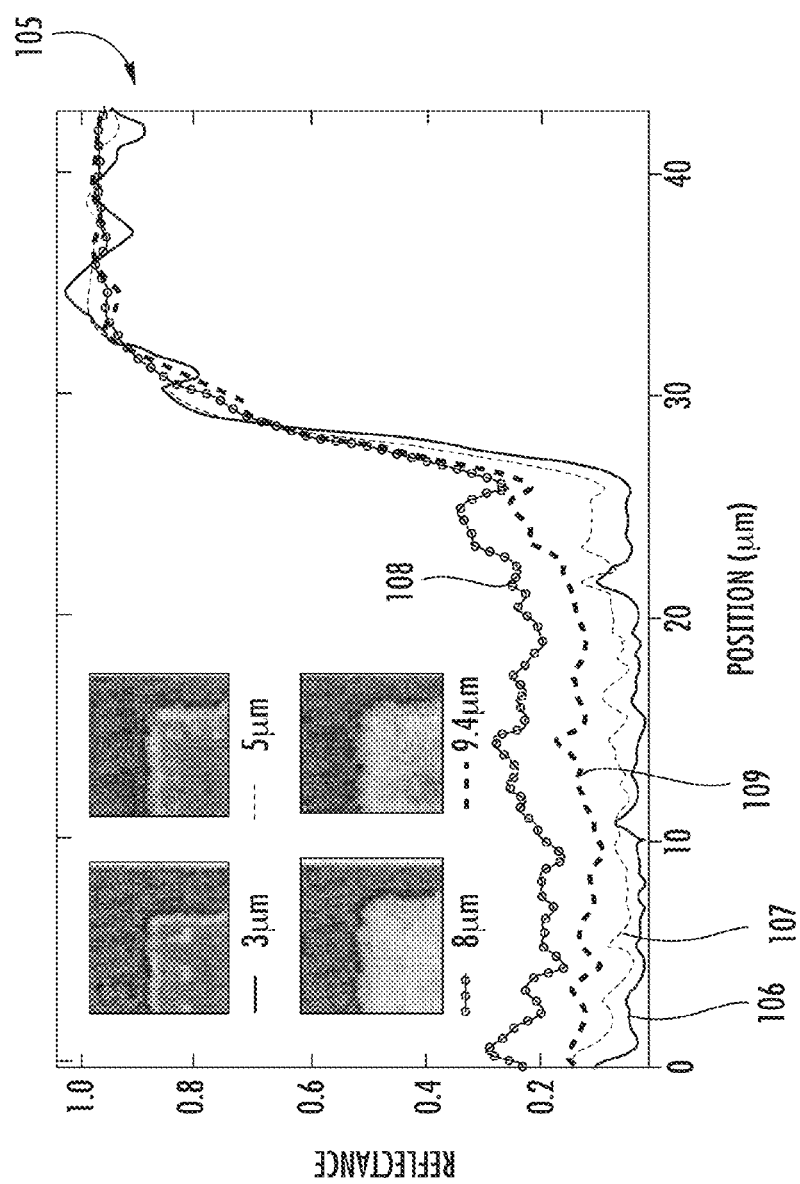
FIG. 8c is a diagram showing scanned reflectance profile and infrared mapping at four different wavelengths, according to the present disclosure.
Figure 9A:
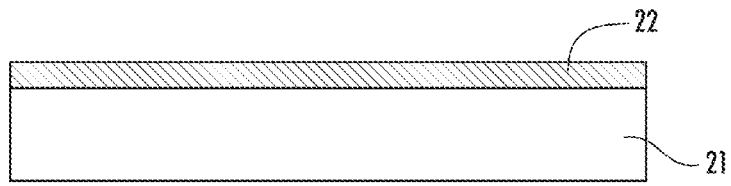
FIGS. 9a-9e are schematic diagrams of side views of steps in making a patterned gold-black IR-absorber, according to the present disclosure.
Figure 9B:
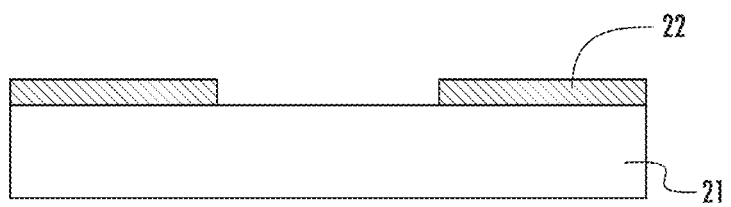
Figure 9C:
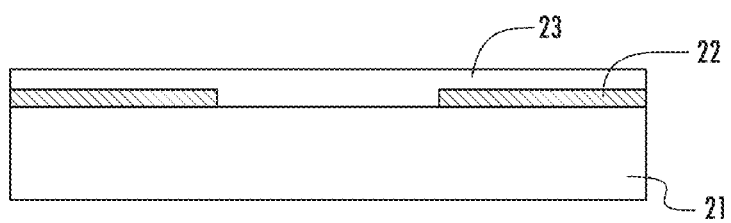
Figure 9D:
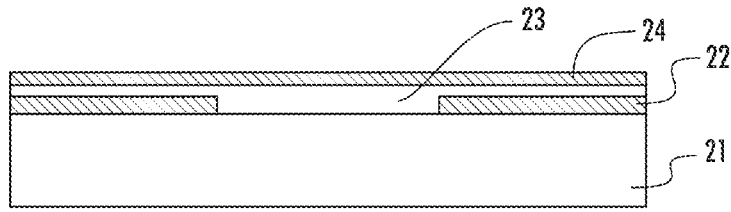
Figure 9E:
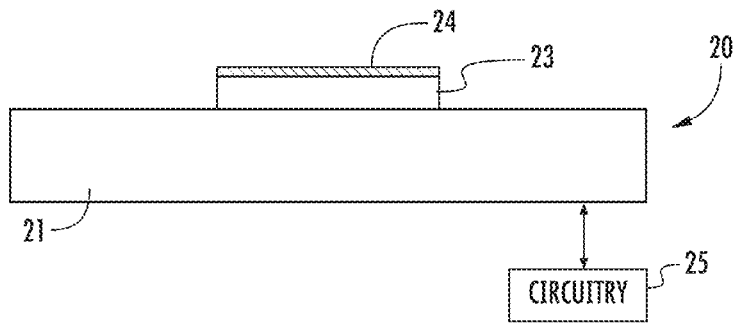
Figure 10:
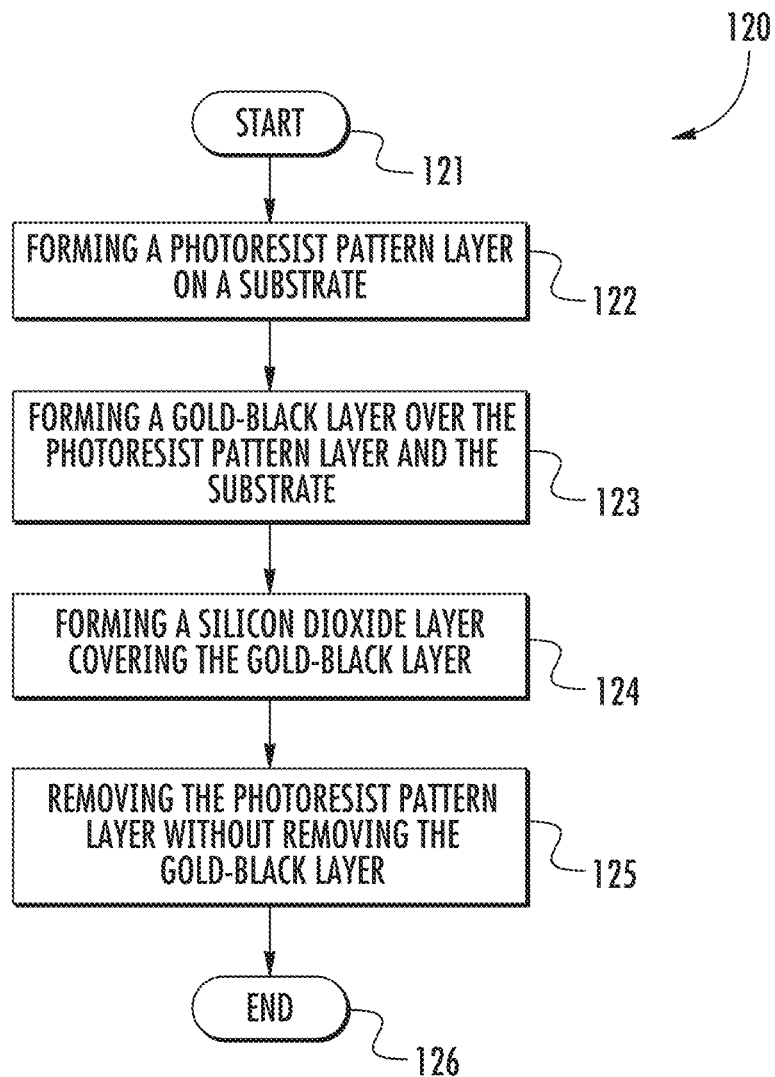
FIG. 10 is a flowchart illustrating the steps in making the IR detector, according to the present disclosure.

Uniform optical response is highly desirable for microelectromechanical system (MEMS) devices to qualify up to industrial standards. FIG. 8c includes a diagram 105 with data on spatial uniformity in reflectance with in the oxide-coated gold-black region and away from its edge. Reflectance line scans across two-dimensional IR images are plotted for 3, 5 and 8 and 9.4 µm wavelengths (curves 106-109, respectively) over 42 µm distance along the scanned profile on the sample. The average reflectance of the gold-black pattern at 3 and 5 µm wavelengths is 3.3% and 6.6% with negligible standard deviation of 1.4% and 2.2%, respectively. The objective lens (20×, 0.65 NA) of the microscope allows to image roughly 10×11 µm² area in a single scan; therefore, a total of 12 images are stitched together to provide information for desired wide field of view. The juncture between the images also add artifacts in the data; therefore, actual standard deviation may be lower.

It can be comfortably concluded that reflectance (absorption in this case, since no transmission through gold substrate) is fairly uniform across the gold-black region in the 3 to 5 µm wavelength range with less than approximately 2% of average fluctuation.

The reflectance at 9.4 µm wavelength is lower than that of a 8 µm wavelength, due to $SiO_2$ absorption band. The infrared image at 9.4 µm shown in FIG. 8c is a mapping of $SiO_2$ on gold-black, and it can be seen that oxide is tapered off during lift-off.

In conclusion, the absorption of patterned oxide-hardened gold-black pattern is unaffected by lift-off in the visible through near-IR spectral range. However, in the mid- to long-wave-IR, lift-off degrades the absorption somewhat due to partial collapse of the fragile gold-black structure from penetration through the pores in the oxide overcoat of acetone solvent during lift-off. Nevertheless, $SiO_2$ over-coating provides enough protection to allow pattern gold-black at micron scales with >90% absorption in 3-5 µm wavelength range. This method provides an opportunity to use highly absorbing gold-black coating in modern infrared detectors with high density of pixels operating in near-to-short-wave infrared range.

Referring now to FIGS. 9a-9e and 10, an IR detector 20 and a method for making (flowchart 120) the IR sensor/absorber according to the present disclosure are now described. The IR detector illustratively includes a substrate 21, circuitry 25 carried by the substrate, a metal-black layer 23 over the substrate and coupled to the circuitry, and a dielectric layer 24 covering the gold-black layer. Although the metal-black layer 23 is illustrated as a gold-black layer, other metal-black materials may be used. The circuitry 25 may include a thermometric element with a measureable thermometric property. The dielectric layer 24 serves as an overcoat layer for the gold-black layer 23.

The circuitry 25 may provide a value for IR radiation absorbed by the gold-black layer 23. Advantageously, as noted herein, the gold-black layer 23 is protected during the manufacturing process known as "lift-off."

In particular, the dielectric layer 24 may comprise a silicon dioxide layer. The dielectric layer 24 and the gold-black layer 23 may form a continuous interface. The dielectric layer 24 may comprise an evaporated dielectric layer, for example. The substrate 21 may comprise silicon material. The dielectric layer 24 may have a thickness between 50 nm and 550 nm.

Another aspect is directed to a method for making an IR absorber 20. The method illustratively includes forming a photoresist pattern layer 22 on the substrate 21 (Blocks 121-122). The method may include forming the gold-black layer 23 over the photoresist pattern layer 22 and the substrate 21, the gold-black layer to be coupled to the circuitry 25 on the substrate (Block 123). The method illustratively includes forming the dielectric layer 24 covering the gold-black layer 23 (Block 124).

In some embodiments, the forming of the dielectric layer 24 may comprise an electron beam evaporation of a dielectric material. The method illustratively includes removing the photoresist pattern layer 22 without removing the gold-black layer 23 (Blocks 125-126). In particular, the dielectric layer 24 provides mechanical strength to the gold-black layer 23 so that it is not damaged during the patterning process commonly known as "lift-off."

Figure 11:
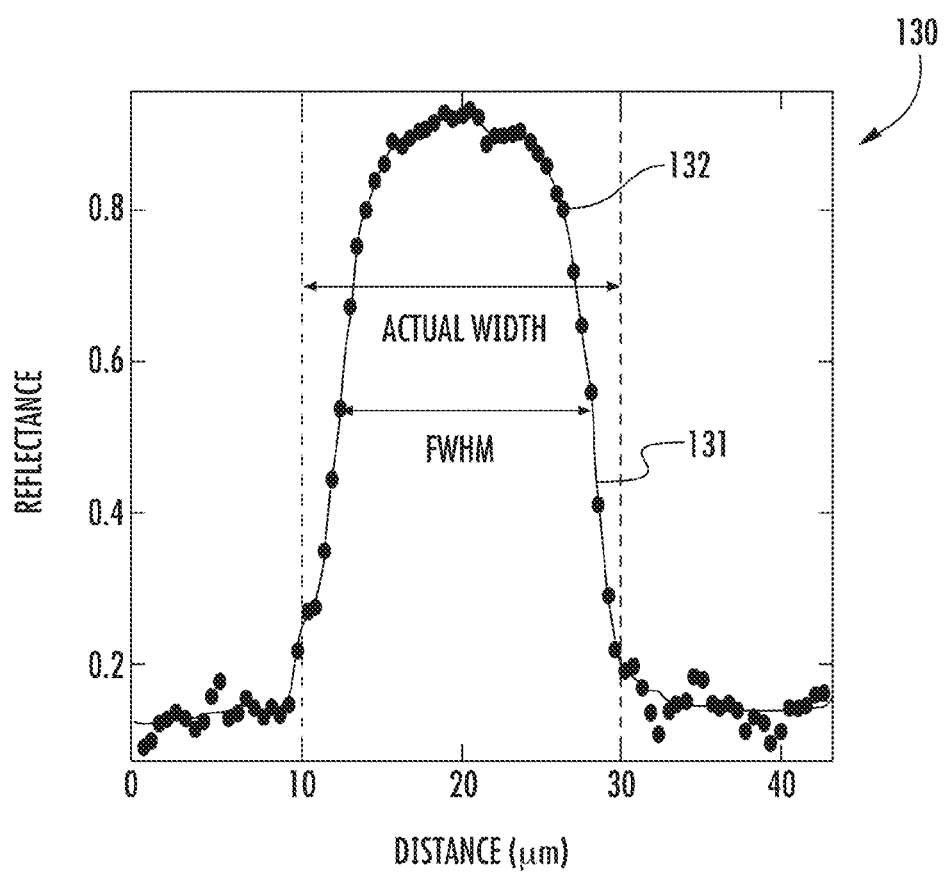
FIG. 11 is a diagram showing the spatial distribution of IR reflectance across a gold-black pattern, according to the present disclosure.
Figure 12A:
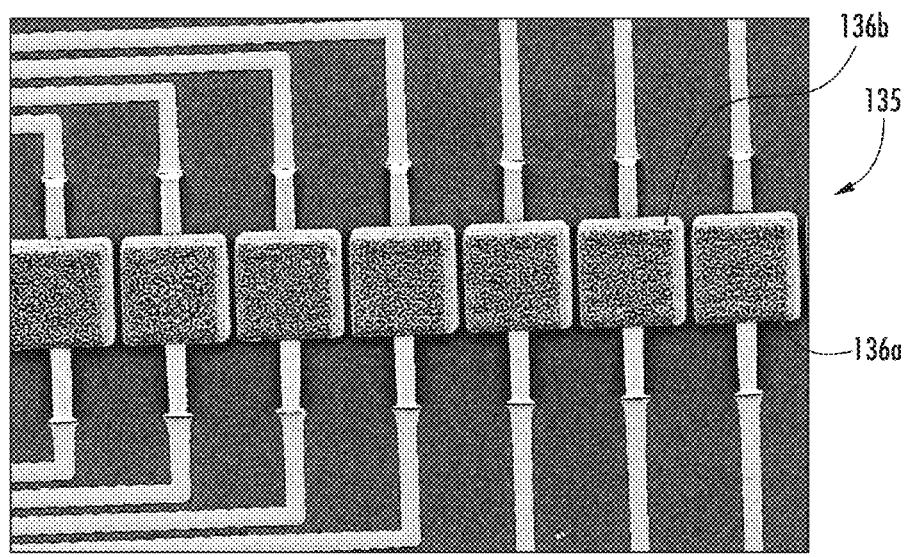
FIG. 12a is an SEM image of a linear array of IR sensors, each with a patterned gold-black absorber, according to the present disclosure.
Figure 12B:
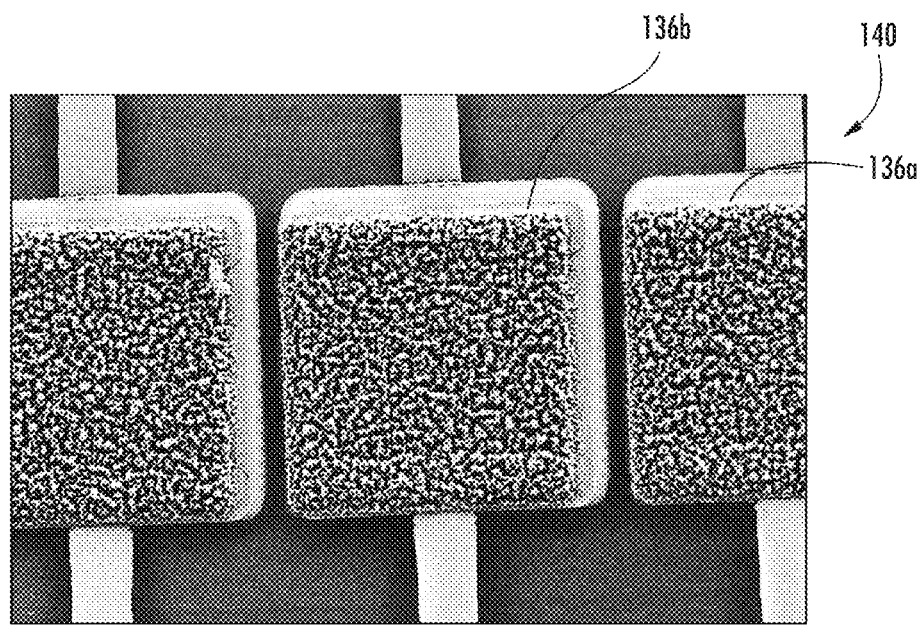
Figure 13:
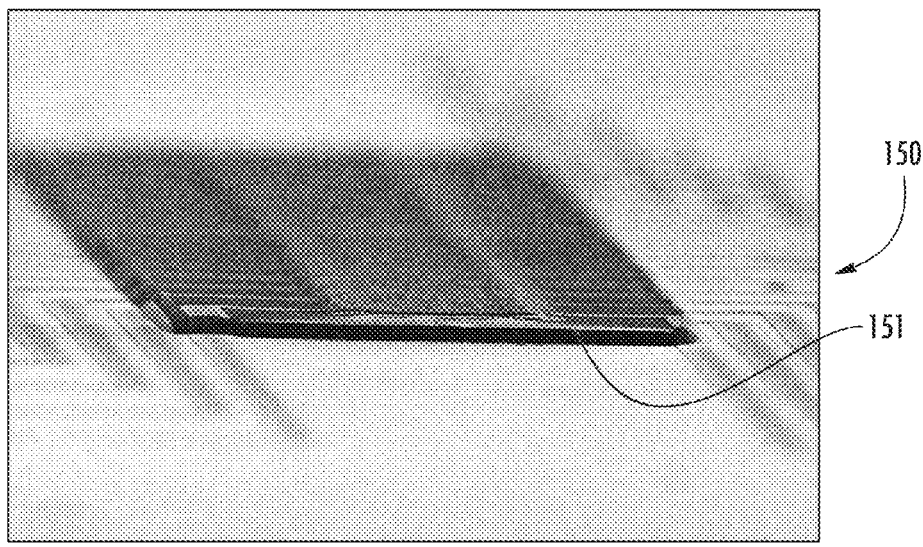
FIG. 13 is a cross-sectional side view SEM image of the linear array of IR sensors coated with a patterned gold-black absorber before removal of sacrificial layer, according to the present disclosure, during manufacture.
Figure 14:
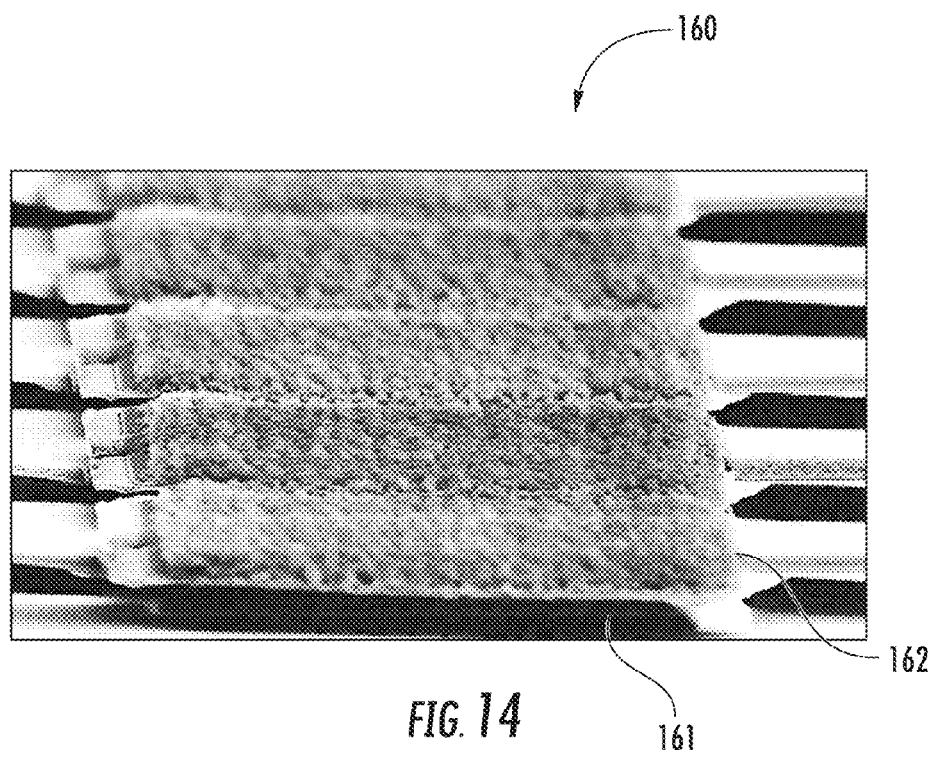
FIG. 14 is a cross-sectional side view SEM image with magnified field of view, showing IR sensors coated with a patterned gold-black absorber after removal of sacrificial layer.

Referring now additionally to FIG. 11, a diagram 130 shows a reflectance line profile across a nominally 20 µm wide oxide-protected gold-black pattern showing decreased absorption at its edges. The marks 132 represent the actual data points, and the grey line 131 is obtained from smoothing the data using Savitzky-Golay algorithm as a guide to calculate full width at half maximum (FWHM).

Referring now additionally to FIGS. 12a-15, images 135 and 140 shows a plurality of IR-detecting pixels 136a-136b with gold-black patterned thereon. These pixels are resistive elements known as bolometers, whose electrical resistance changes with temperature, where the temperature change is caused by the absorption of infrared radiation. Separation of the IR pixels 136a-136b is kept minimal at 6 microns. Images 150 and 160 show an IR sensor/absorber 20 before and after release of a sacrificial layer 151.

The sacrificial layer 151 is made of polyamide, which acts as a base for fabrication of the IR sensor/absorber (i.e. the bolometer) membrane. However, it needs to be removed to create a Fabry Perot cavity 161 to thermally isolate the resistive element from the substrate. This process is typical for any resistive micro-bolometer. Gold-black 162 was patterned onto the pixels first, as taught in this disclosure. Then, the polyamide layer was etched in oxygen plasma. As shown in FIG. 15, the oxide-hardened gold-black 162 survives this entire process. The polymide sacrificial layer is etched successfully, and the fabry perot cavity is visible. The patterned gold-black layer appears to be a couple of microns thick. Adding mass of gold in the molybdenum boat before evaporation can increase the final thickness.

Other details related IR sensor/absorbers and related methods may be found in the article titled "Patterning of oxide-hardened gold-black by photolithography and metal lift-off," Deep Panjwani at al., Infrared Physics & Technology 62 (2014) 94-99, the contents of which are hereby incorporated by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An infrared (IR) detector comprising:
a substrate;
circuitry carried by said substrate;
said circuitry comprising a thermometric element with a measurable thermometric property;
a gold-black layer over said thermometric element; and
a dielectric layer covering said gold-black layer;
said circuitry providing a value for IR radiation absorbed by said gold-black layer.

2. The IR detector of claim 1 wherein said dielectric layer comprises a silicon dioxide layer.

3. The IR detector of claim 1 wherein said dielectric layer and said gold-black layer form a continuous interface.

4. The IR detector of claim 1 wherein said dielectric layer comprises an evaporated dielectric layer.

5. The IR detector of claim 1 wherein said substrate comprises silicon material.

6. The IR detector of claim 1 wherein said dielectric layer has a thickness between 50 nm and 550 nm.

7. A method for making an infrared (IR) detector comprising:
forming a photoresist pattern layer on a substrate;
forming a metal-black layer over the substrate and the photoresist pattern layer, the metal-black layer to be coupled to circuitry on the substrate;
forming a dielectric layer covering the metal-black layer; and
removing the photoresist pattern layer together with a portion of the metal-black layer residing on top of it without removing a remainder of the metal-black layer.

8. The method of claim 7 wherein the metal-black layer comprises a gold-black layer.

9. The method of claim 7 wherein the forming of the dielectric layer comprises an electron beam evaporation of a dielectric material.

10. The method of claim 7 wherein the dielectric layer comprises a silicon dioxide layer.

11. The method of claim 7 wherein the forming of the dielectric layer on the metal-black layer includes defining a continuous interface.

12. The method of claim 7 wherein the substrate comprises silicon material.

13. The method of claim 7 wherein the dielectric layer has a thickness between 50 nm and 550 nm.

14. A method for making an infrared (IR) detector comprising:
forming a photoresist pattern layer on a substrate;
forming a gold-black layer over the photoresist pattern layer and the substrate, the gold-black layer to be coupled to circuitry on the substrate;
forming a silicon dioxide layer covering the gold-black layer; and
removing the photoresist pattern layer together with the gold-black layer residing on top of it without removing a remainder of the gold-black layer.

15. The method of claim 14 wherein the forming of the silicon dioxide layer comprises an electron beam evaporation of a silicon dioxide material.

16. The method of claim 14 wherein the forming of the silicon dioxide layer on the gold-black layer includes defining a continuous interface.

* * * * *

UNITED STATES PATENT AND TRADEMARK OFFICE
CERTIFICATE OF CORRECTION

PATENT NO. : 9,518,868 B2  
APPLICATION NO. : 14/308879  
DATED : December 13, 2016  
INVENTOR(S) : Deep Panjwani Page 1 of 1

It is certified that error appears in the above-identified patent and that said Letters Patent is hereby corrected as shown below:

On the Title Page

Item (73), Assignee        Delete: "Univerity of Central Florida Reseach Foundation, Inc."

Insert: -- University of Central Florida Research Foundation, Inc. --

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*